United States Patent
Plunkett et al.

[15] 3,652,879
[45] Mar. 28, 1972

[54] ELECTRIC POWER TOOL

[72] Inventors: Larry E. Plunkett, Montgomery; Spencer C. Rees, Aurora, both of Ill.

[73] Assignee: Thor Power Tool Company, Aurora, Ill.

[22] Filed: July 22, 1970

[21] Appl. No.: 57,176

[52] U.S. Cl.................................310/50, 310/47, 310/242, 77/7
[51] Int. Cl.......................................................H02k 7/14
[58] Field of Search.....................310/50, 47, 154, 239, 242, 310/254; 77/7

[56] References Cited

UNITED STATES PATENTS

| 3,418,504 | 12/1968 | Paule | 310/50 |
| 3,142,772 | 7/1964 | Jones | 310/62 |
| 3,521,096 | 7/1970 | Merriam | 310/154 |
| 3,182,218 | 5/1965 | Videtic | 310/239 |
| 3,127,533 | 3/1964 | Gardner | 310/239 |
| 3,413,498 | 11/1968 | Bowen | 310/50 |
| 3,432,703 | 3/1969 | Sheps | 310/50 |

Primary Examiner—J. D. Miller
Assistant Examiner—R. Skudy
Attorney—Hibben, Noyes & Bicknell

[57] ABSTRACT

An electric power tool having a housing, a fan and a motor including brushes, a commutator, an armature, and a stator. The brushes are mounted on a brush board which fits closely adjacent the commutator. The stator comprises a shell and circumferentially spaced permanent magnet segments secured to the shell, air passages being formed by the spaces between the segments. Openings are provided in the housing to permit air to be drawn in by the fan, the air being channeled by the housing and the brush board over the commutator and through the passages in the stator, thus effectively cooling the commutator and the armature of the motor.

8 Claims, 5 Drawing Figures

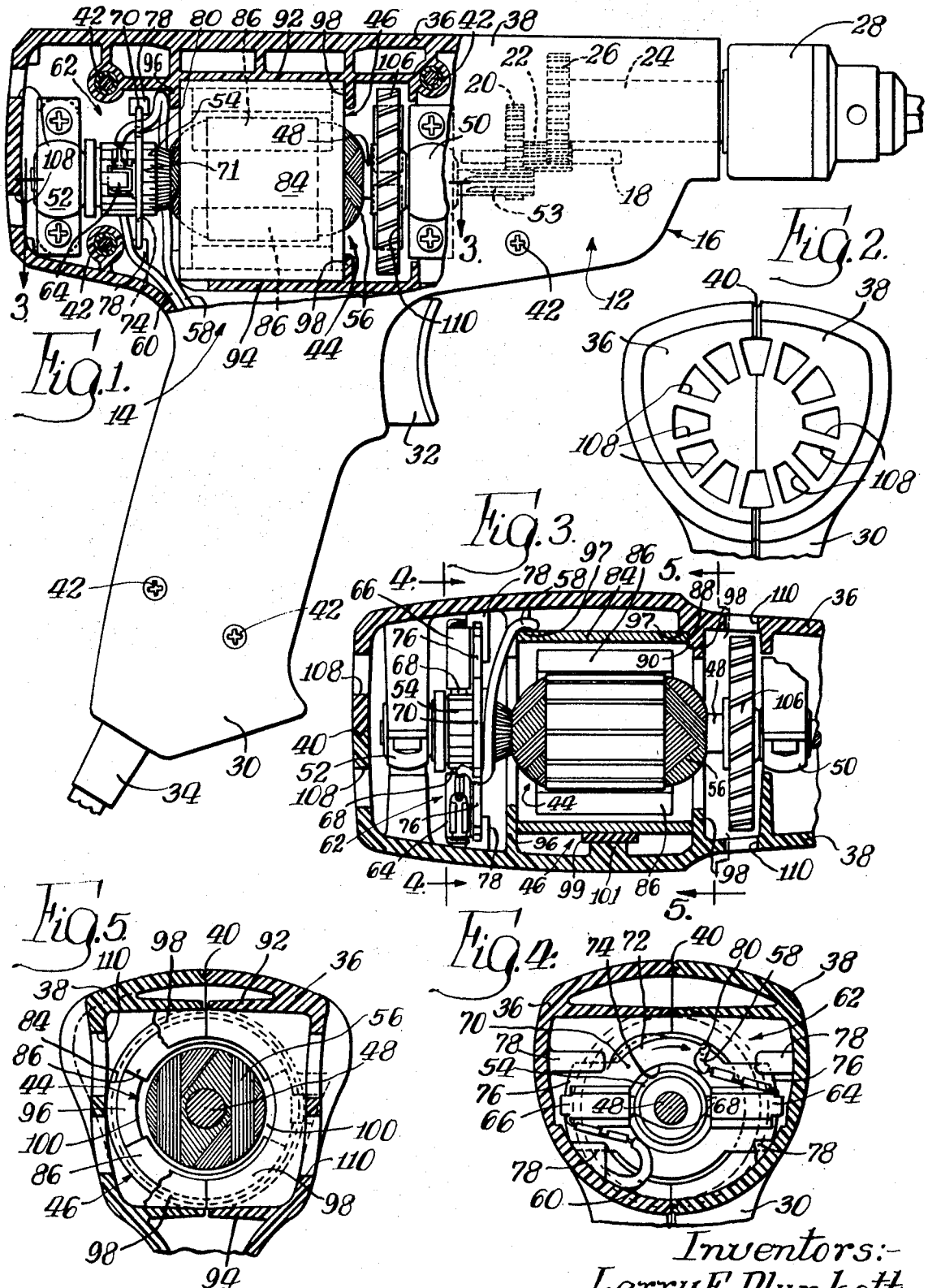

ELECTRIC POWER TOOL

For convenience of the user, an electric portable power tool should be as lightweight, compact, and have as high power output as possible. Portable power tools are usually driven by universal motors having stator field windings, series connected through brushes and a commutator to the armature winding. The power output of such motors, of course, may be increased by passing more current through the motor, but unfortunately, such a power increase is normally accompanied by increased heat and higher operating temperatures. While the size of the conductors forming the windings may be increased to avoid overheating, such remedy makes a compact design difficult. In most power tools a fan is provided to cool the motor, but in prior art tools the air flow provided by the fan has been relatively inefficient.

According to the present invention, a lightweight, compact electric power tool has been provided including a motor having a relatively large power rating for its size. The tool comprises a motor including an armature, a permanent magnet stator and a cooling fan mounted in a housing, the fan being driven by the motor. The stator has air passages therethrough and the housing is formed or shaped to direct cooling air drawn by the fan through the passages and across the armature windings. The tool further comprises a brush assembly for carrying current to the armature windings. The brush assembly includes a brush board which is mounted in the housing and directs cooling air across the commutator and to the stator air passages thus effectively cooling the motor and permitting an increased power rating.

Further advantages of the present invention will become apparent from the following detailed description taken in conjunction with the accompanying figures of the drawing, in which:

FIG. 1 is a side elevational view of a drill featuring the preferred embodiment of the present invention, with parts thereof broken away to more clearly show underlying parts;

FIG. 2 is a fragmentary rear elevational view of the drill shown in FIG. 1;

FIG. 3 is a fragmentary cross-sectional view taken along the line 3—3 of FIG. 1;

FIG. 4 is a fragmentary cross-sectional view taken along the line 4—4 of FIG. 3; and FIG. 5 is a fragmentary cross-sectional view taken along the line 5—5 of FIG. 3, with parts broken away to more clearly show underlying parts.

An electric power tool which in the present instance is a portable drill, is illustrated in FIG. 1 and includes gear reduction mechanism 12 and a motor 14 enclosed in an outer housing 16. The gear reduction mechanism is disclosed in the copending Spencer C. Rees, U.S. Patent application Ser. No. 57,275 filed July 22, 1970 and comprises an intermediate shaft 18 having gears 20 and 22 thereon, and a spindle shaft 24 having a gear 26 which is driven by gear 22. A chuck 28 is driven by the shaft 24, and the spindle shaft 24, and the intermediate shaft 18 are mounted in bearing means (not shown).

The drill has mounted in a handle portion 30 of the housing 16 a trigger 32, an electric cord 34 and other electrical components hereinafter described.

The outer housing 16 comprises two halves, a support half 36 and a cover half 38, the two halves being joined at a common longitudinal split 40. The support half carries and supports the motor 14. The cover half 38 generally does not carry or support components of the drill but acts as a closure, as will be hereinafter described. The halves 36 and 38 are fastened together by interlocking bosses (not shown) and recesses (not shown) formed in the halves and are held together by screw fasteners 42.

The motor 14 which is a universal type, comprises a rotor or armature 44 and a stator 46. The armature 44 has an armature shaft 48 which is supported by a front bearing 50 and a rear bearing 52, the bearings being secured to the support half 36. An integral gear 53 is formed on the shaft 48 to drive the gear 20. Also secured to the shaft 48 are a commutator 54 and armature laminations and windings 56.

The trigger 32 controls the operation of an on-off switch (not shown). When the cord 34 is plugged into an electrical outlet and the switch is closed by pressing the trigger, current flows through a power circuit including the cord 34, the switch, a brush assembly 62, the commutator 54, and the armature windings. A speed control circuit of the type disclosed in Brown U.S. Pat. No. 3,447,057 may also be included in the above power circuit. In FIGS. 1, 3 and 4, two wires 58 and 60 of the power circuit carry power to the brush assembly 62.

The brush assembly 62 (FIGS. 3 and 4) comprises a pair of electrically conductive brush holders 64 and 66, which are secured to a brush board 70 made of an insulating material. A brush 68 and a spring (not shown) are located in each brush holder. The brush holders 64 and 66 are rectangular in cross-section as are the brushes 68. The holders 64 and 66 and the brushes 68 are disposed 180° apart, and the brushes 68 are biased by the springs toward each other and into contact with the commutator 54. The springs also electrically connect the brushes 68 to the brush holders 64 and 66. The wire 58 is electrically connected to the brush holder 64, and the wire 60 is electrically connected to the brush holder 66. The brush holders 64 and 66 are fastened to the brush board 70 by extended tabs 71 (FIG. 1) formed on the holders 64 and 66 which pass through openings and are bent over on the opposite side of the brush board 70.

The brush board 70 is formed from a flat piece of electrical insulating material such as phenolic resin and has an enlarged center, circular portion 72 having a circular opening 74 which fits closely adjacent the commutator 54. The board 70 also has end extensions 76 which engage inwardly raised U-shaped walls or sockets 78 formed in the support half 36 and the cover half 38 to retain the board 70 in position. In one margin of the board 70 is formed a notch 80 (FIG. 4) of an omega shape having a narrow throat into which the wire 58 is forced. The notch 80 positively secures the end of the wire 58 so that, should its connection with the brush holder 64 break, the wire 58 could not possibly be exposed so as to come in contact with the operator. The notch 80 thus eliminates the need for a separate fastener or clip and sufficiently retains the loose end of the wire to meet standards of double-insulated tools. A notch is not required for the other wire 60 because it is wedged between the board 70 and the housing, as shown in FIGS. 1 and 4, and thus held in place.

Further, unlike prior art tools, the brushes 68 may be replaced only by complete disassembly of the housing 16 of the tool. The hazardous task of changing brushes will with the tool havings its electric cord still connected is thereby made more difficult.

The stator 46 includes permanent magnets to provide the magnetic field. The stator comprises a tubular shell 84 (FIGS. 3 and 5) and two ceramic magnet segments 86. The shell 84 at one end has a notch 88 (FIG. 3) which engages a lug 90 formed in the support half 36 to prevent the shell 84 from rotating and is further contained in nests or pockets formed by integral walls 92, 94, 96 and 98 of the housing (FIGS. 1, 3 and 5). As shown in FIG. 3, the portions of the walls 96 and 98, which are in the housing half 36, have arcuate recesses 97 therein, and the shell 84 is seated in the recesses 97. The other housing half 38 includes a rubber bumper 99 (FIG. 3) positioned on a protrusion 101, the bumper 99 holding the shell 84 firmly in the recesses 97 when the two housing halves are assembled. Each magnet segment 86 is a circular arc of about 120° and of a length somewhat less than that of the shell 84. The magnetic segments 86 are spaced apart thus forming two air passages 100 (FIG. 5) on the inner periphery of the stator between the segments and adjacent the armature. The segments 86 are secured to the interior of the shell 84 as by means of an industrial adhesive or an epoxy resin.

A fan 106 is mounted on the armature shaft 48 in front of the stator 46 for cooling the motor 14. Air intake openings 108 (FIGS. 1 and 2) are formed in the rear of the housing, and air outlet openings 110 (FIG. 3) are formed in the sides of the housing adjacent the fan 106. When the motor 14 rotates in a clockwise direction as viewed from the rear, the fan 106 draws air into the housing through openings 108, over the bearing 52, and through the opening 74 and around the edges of the brush board 70. The brush board 70 thus serves to direct most of the air around and closely adjacent the commutator 54 to increase the effectiveness of the cooling thereof. The air then flows through the passages 100 between the magnet segments 86 of the stator 46 and closely adjacent the armature windings 56. Due to the walls 92, 94, 96 and 98 of the housing, which walls extend generally radially inward closely adjacent the outer periphery of the shell 84, all of the cooling air is channeled or force to flow through the passages 100, and consequently cooling air in large volume is supplied to the armature windings 56. The air is then forced out of the housing by centrifugal action induced by the fan 106 through the openings 110. The air exiting from the openings 110 tends to blow or force away debris or cuttings so as to prevent such material from being drawn into the inlet openings 108. As mentioned above, the interior walls of the housing 16, as shown in FIG. 1, generally confine the air flow to the path above described.

Thus, as was heretofore stated, the power rating of the motor of a given size may be increased by supplying more current to the motor without overheating, because the cooling air is baffled closely adjacent the commutator and the armature, resulting in more efficient cooling of the motor. Further, the use of powerful permanent magnets to provide the magnetic field is advantageous because they do not generate heat as do conventional field windings.

We claim:

1. An electric power tool comprising a housing having air intake and outlet openings and being split to form a cover half and a support half, and a motor having a fan for moving air through said housing, an armature, a brush assembly, and a stator having air passages formed on its inner periphery adjacent said armature, said halves having integral sockets formed therein for holding said brush assembly in position in said housing, said housing having integral wall portions extending generally radially inward adjacent said stator, said wall portions holding said stator in position in said housing and cooperating with said stator to block air flow around the outer periphery of said stator and thus channel substantially all the air through said air passages for cooling said armature.

2. A tool as in claim 1, wherein said stator includes a plurality of spaced magnet segments, said spaces between said magnet segments forming said air passages.

3. A tool as in claim 1, wherein said stator includes a shell and ceramic magnet segments, said ceramic magnet segments being spaced apart in said shell, said ceramic magnet segments forming said air passages therebetween.

4. A tool as in claim 1, and further comprising a commutator secured to said armature, said brush assembly including a brush board mounted in and extending from said housing to closely adjacent said commutator for directing air flow around said commutator.

5. A tool as in claim 1, wherein said fan is mounted in front of said stator, said intake opening being located at the rear of said housing, said outlet opening being located at the side of said housing, said intake and outlet openings being at opposite ends of said stator.

6. An electric power tool comprising a housing having air intake and outlet openings, a motor, a fan connected to said motor for moving air through said housing, said motor including an armature, a commutator secured to said armature, and a brush assembly including brushes contacting said commutator and a brush board having a center opening therein, said commutator rotating in said center opening of said board, said housing having socket portions extending generally inward for holding said brush board in position in said housing, said brush board cooperating with said housing to direct the air through said center opening for cooling said commutator.

7. A tool as in claim 6, wherein said brush board has a notch in a margin thereof, and said tool further comprises at least one electric wire connected to one of said brushes, said wire being positioned in and tightly secured in said notch whereby should said wire break said wire will be retained within said housing so as not to contact an operator of said tool.

8. A tool as in claim 6, wherein said brush board is made of an insulating material, and further includes brush holders for holding said brushes, said brush holders being secured to said board, said brush assembly being entirely contained within said housing and being replaceable only by disassembly of said housing.

* * * * *